July 3, 1956
D. W. GUY
2,753,152
VEHICLE SHIFTING DEVICE
Filed Feb. 11, 1955
4 Sheets-Sheet 3
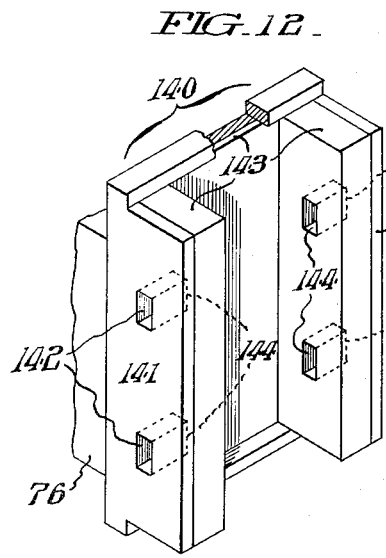
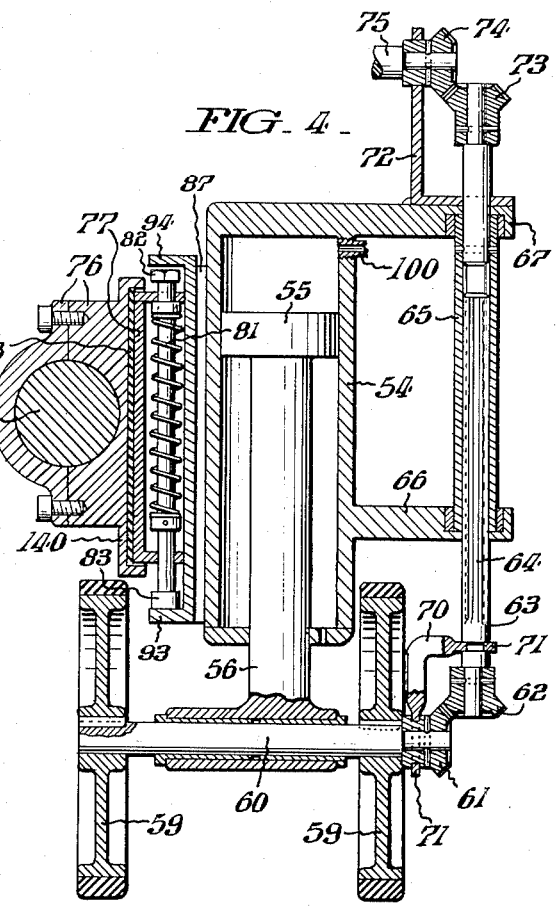
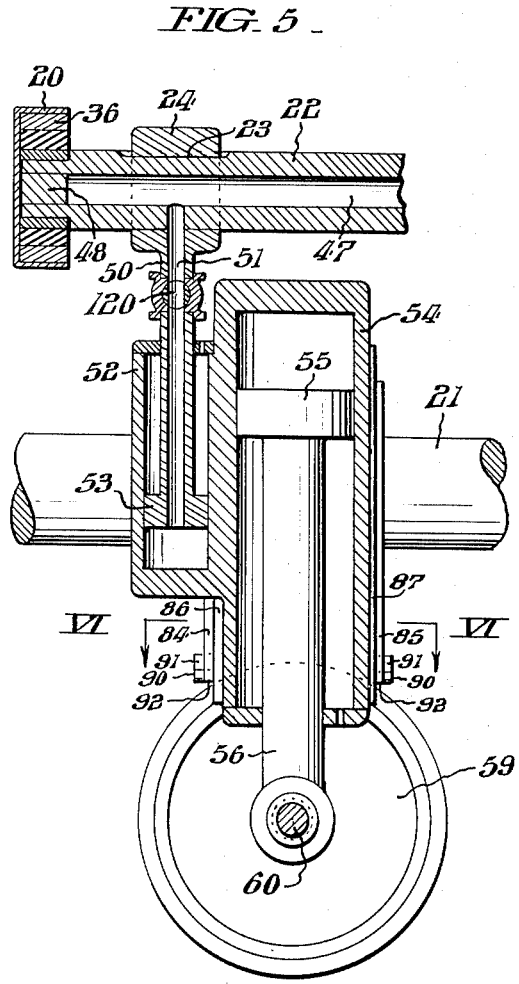
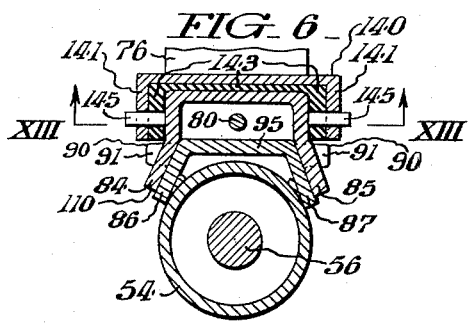
INVENTOR.
David Wade Guy,
BY Paul & Paul
ATTORNEYS.

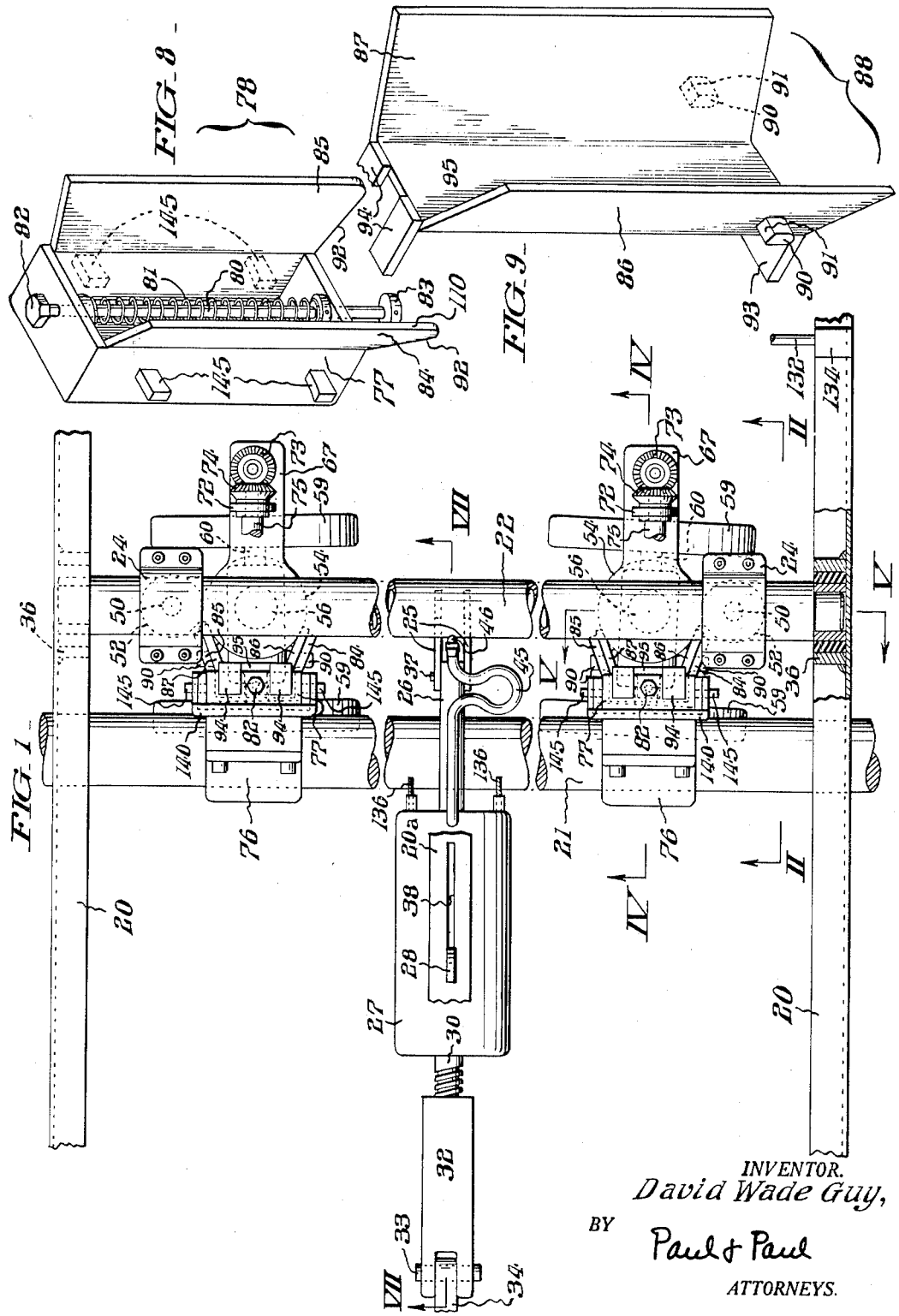

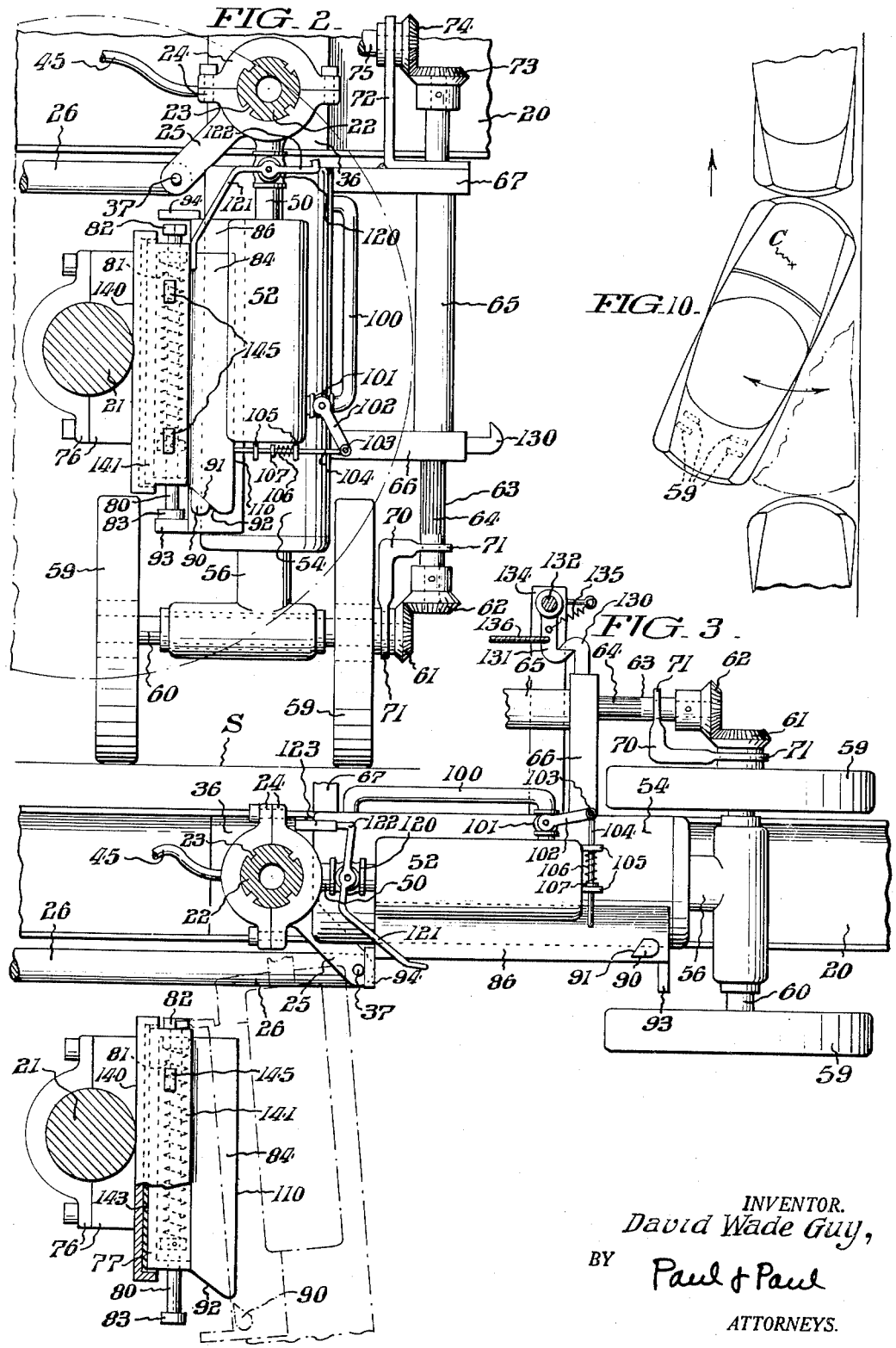

July 3, 1956 D. W. GUY 2,753,152
VEHICLE SHIFTING DEVICE
Filed Feb. 11, 1955 4 Sheets-Sheet 4
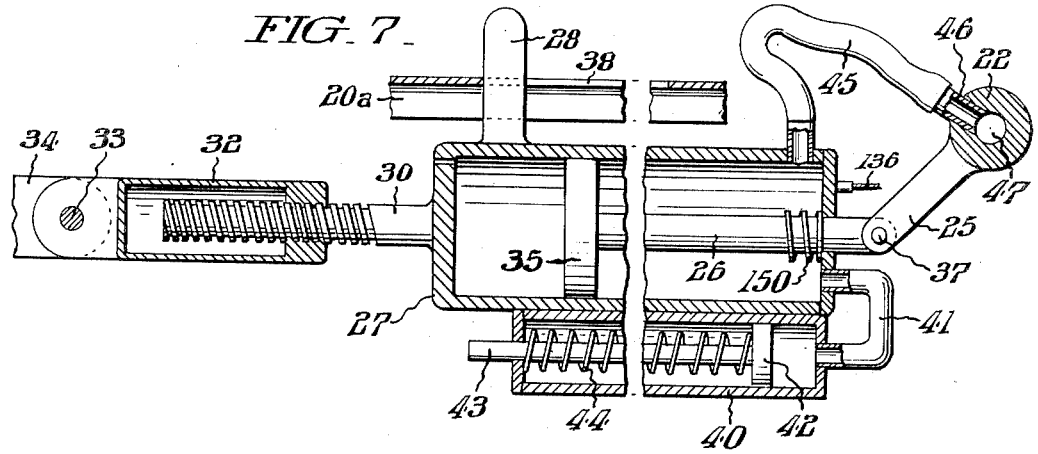
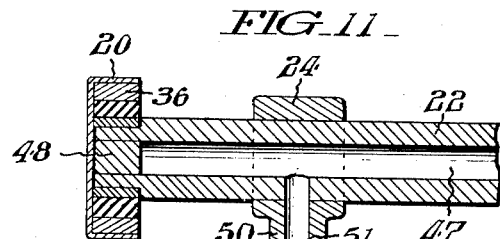
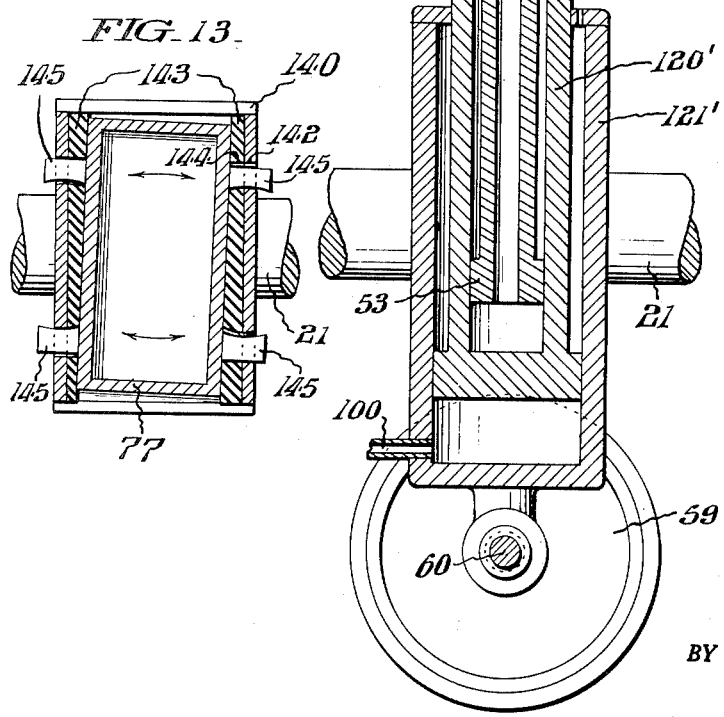
INVENTOR.
David Wade Guy,
BY Paul & Paul
ATTORNEYS.

United States Patent Office 2,753,152
Patented July 3, 1956

2,753,152

VEHICLE SHIFTING DEVICE

David Wade Guy, Rosemont, Pa., assignor to Wade Guy Corporation, Rosemont, Pa., a corporation of Pennsylvania Application February 11, 1955, Serial No. 487,683

19 Claims. (Cl. 254—86)

This invention relates to a vehicle shifting device which shifts a vehicle body member up and down. More particularly, it relates to a jacking device which is swingably carried by the body portion of an automobile, truck, carriage or other conveyance which is supported on wheels for movement along a supporting surface, such conveyances being hereinafter referred to generically as vehicles.

More particularly, this invention relates to a jack which is carried by a body member of a vehicle supported on a supporting surface, said jack having capacity for swinging movement relative to the body member for engagement with an axle member and for engagement with the supporting surface, whereby the jack has capacity to lift the axle member and the body with respect to the supporting surface. The term "axle member" as used above is intended to include the axle itself, axle housing, and associated members.

Although it has heretofore been proposed to mount a jack on an automobile body in such manner that it may be shifted vertically for engagement with the supporting surface, and although it has been suggested to provide such a jack with an extension member which extends beneath one of the main axles of the automobile, the art has not to my knowledge heretofore created a completely practical device of this type which firmly engages the main axle or axle housing and has capacity to exert directly on the axle housing a sufficient lifting force to lift the axle member and the entire body member as well.

It is accordingly an object of this invention to provide an improved jacking device which has the advantages and overcomes the difficulties referred to above.

It is well known that, in vehicles having body members supported on springs or other compressible members which are in turn supported by wheels and axles, it is desirable to keep the weight of the wheels and axles, or unsprung weight, at a minimum. Increased unsprung weight increases the momentum of road shocks and correspondingly increases the extent to which the road shocks are transmitted through the springs to the body. However, it is desirable in jacking a vehicle to apply the lifting force to an unsprung portion of the vehicle, so that the sprung body of the vehicle continues to rest on its springs or other compressible members whether fully compressed or not, even after it is lifted.

It is another object of this invention to provide a jacking device for a vehicle having a sprung portion resting on springs supported on an unsprung portion, which jacking device is normally carried by the sprung portion of the vehicle but which has capacity to engage an unsprung portion of the vehicle and to lift the vehicle so that the sprung portion continues to rest on the springs or other compressible members whether fully compressed or not, even after the vehicle is lifted.

Another object of this invention is to provide a jack carried by a sprung portion of a movable body which has sprung and unsprung body portions, including automatic means for swinging the jack downwardly for engagement with an unsprung portion and then for extending the jack automatically to lift the vehicle.

Still another object of this invention is to provide a jacking device of the character indicated which is pivotally connected to the body member for swinging movement in a plane extending substantially longitudinally of the body member, which has capacity to contact and engage a main axle member, and wherein means are provided for maintaining the jacking device in a fixed position with respect to the longitudinal axis of any axle. Another object of this invention is to provide a jacking device of the character indicated which provides a means for lifting and then substantially laterally shifting all or a part of the body member. Still another object of this invention is to provide a jacking device of the character indicated which is mounted on wheels and which includes power means for rotating the wheels to shift the body member at substantially right angles or in an arc to its longitudinal axis.

Another object of this invention is to provide a completely automatic hydraulic or mechanical jacking device which may readily be controlled from within the vehicle or otherwise and which may be automatically moved from an inoperative position to an operative position for engaging the supporting surface and the main axle, and which then automatically lifts the main axle member and the body member with respect to the supporting surface. Still another object is to provide a novel means for engaging and locking the jack and the axle housing, even when the vehicle body is tilted with respect to the axle.

Other objects and advantages of this invention, including the automatic operation of the same, as well as the ease with which it may be incorporated into existing vehicles, will further become apparent hereinafter and in the drawings whereof:

Figure 1 represents a plan view, looking down from the body of a vehicle, showing typical jacking devices which embody features of this invention;

Fig. 2 represents a sectional view taken as indicated by the lines and arrows II—II which appear in Fig. 1, the jacking device being shown in its operative position with respect to the supporting surface;

Fig. 3 represents a sectional view similar to Fig. 2, showing the jacking device in an elevated or inoperative position with respect to the supporting surface;

Figs. 4 and 5 represent sectional views of the apparatus, taken as indicated by the lines and arrows IV—IV and V—V, respectively, which appear in Fig. 1;

Fig. 6 represents a sectional view taken as indicated by the lines and arrows VI—VI which appear in Fig. 5;

Fig. 7 represents a vertical sectional view, somewhat enlarged, of one specific form of apparatus for shifting the jacking device between its operative and inoperative positions with respect to the supporting surface. This sectional view is taken as indicated by the lines and arrows VII—VII which appear in Fig. 1;

Fig. 8 represents a view in perspective, considerably enlarged, showing one form of jack-engaging member in accordance with this invention;

Fig. 9 represents a corresponding view in perspective illustrating a corresponding engaging member which is carried by the jacking device;

Fig. 10 represents a diagrammatic plan view of an automobile into which one or more jacking devices are incorporated in accordance with this invention. This figure illustrates how the invention facilitates the moving of an automobile into a restricted space;

Fig. 11 represents a sectional view similar to Fig. 5, showing a modified form of this invention;

Fig. 12 represents a view in perspective of a mounting means comprising a part of the jack engaging device;

Fig. 13 represents a vertical sectional view of the mounting means and jack-engaging means, illustrating how the jack-engaging means may be tilted with respect to the axle member on which it is mounted; and Fig. 14 represents a diagrammatic view showing a portion of the axle member and frame member of a vehicle, and of the corresponding jack-engaging and axle-engaging members of the jacking device, illustrating how said members are tilted relative to one another when the body member of the vehicle, which is mounted on the frame member, is non-uniformly loaded.

Although specific terms will be used for the sake of clarity in the specification which follows, it is to be expressly understood that such specific terms do not limit the scope of the invention, but are merely intended to refer conveniently to the specific devices shown in the drawings.

It will be appreciated that the jacking apparatus of this invention is broadly carried by a body member of a movable vehicle or the like. Referring to the drawings, the vehicle body member preferably includes longitudinal frame members 20. Also, it will be appreciated that the vehicle body member is mounted on springs or other compressible members in the conventional manner, such springs not being shown in the drawings. The springs or other compressible members are attached to main axle members 21, each main axle member in turn carrying an axle having at its ends main wheels (not shown) on which the vehicle is supported for movement along a supporting surface S. The supporting surface S may be the earth, a highway, a floor or any other surface on which a movable vehicle is supported. The main axle member 21 may be an axle housing or any other structure attached or connected to the axle of the vehicle.

Fixed to and extending transversely between the longitudinally extending frame members 20 is an auxiliary, hollow shaft 22 which is keyed at 23 and thereby affixed to a clamp collar 24. Crank arms 25 are fixed to the shaft 22, and are pivotally connected at 37 to a piston 26 which is longitudinally reciprocable within a cylinder 27. Although cylinder 27 may be actuated by any fluid such as air, gas or liquid, it will be referred to hereinafter as a hydraulic cylinder.

Turning more specifically to Figs. 1 and 7 of the drawings, the hydraulic cylinder 27 has at one of its closed ends an axially aligned helically threaded rod 30 which is axially reciprocable along with the cylinder 27. Threaded to the rod 30 is a rotatable member 32 pivoted at 33 to a drive shaft 34 which is rotated by a reversible power drive device, not shown. A vertically extending fin 28 is shown slidable within a slotted portion 38 of any fixed member such as the frame 20a, and prevents rotation of the cylinder 27 without otherwise limiting its movement. However other means could be used to prevent such rotation. A piston 35 (Fig. 7) is affixed to the piston rod 26 and has capacity to reciprocate within the cylinder 27.

The number 40 in Fig. 7 designates a compression cylinder which is hydraulically connected to cylinder 27 by means of a tube 41, or may be connected to the fluid conductor anywhere. Piston 42 having a piston rod 43 is reciprocable within the compression cylinder 40. The number 44 designates a spring (which is sufficiently strong to accommodate any pressure of fluid employed) surrounding and extending axially with the rod 43, inside the compression cylinder 40.

The chamber 27 is connected by flexible tubing 45 to a short length of pipe 46 which communicates with the hollow center 47 of the shaft 22. It will be appreciated that the shaft 22 is rotatable in flexible mounted bearings 36 in the longitudinally extending frame members (see Figs. 1, 5) and that the hollow center 47 is sealed by seals 48.

Accordingly, it will be appreciated that rotation of the threaded rotatable member 32 in Fig. 7 moves the rod 30 axially, displacing cylinder 27 thereby forcing fluid under pressure from cylinder 27 through flexible tubing 45 into the passage 47 in the center of the shaft 22 and to a degree into the compression cylinder. As cylinder 27 is moved to the left, it first forces fluid into cylinder 40 and also unlocks through wires 136, the catches 131 from catches 130. Then the piston rod 26 is displaced axially, moving the crank arm 25 and causing the shaft 22 to turn about its axis.

Referring more particularly to Figs. 1, 2 and 5 of the drawings, a jack piston rod 50 is fixed to one portion of the clamp collar 24 and extends radially outwardly from the shaft 22. As illustrated in Fig. 5, the jack piston rod 50 is hollow, having a central passage 51 communicating with the passage 47. The piston rod 50 terminates at a piston enlargement 53 which is axially reciprocable in an auxiliary cylinder 52 of relatively small diameter. The auxiliary cylinder 52 is affixed to a main lifting cylinder 54 of relatively large diameter, in which a piston 55 having a piston rod 56 is axially reciprocable. Carried at the base of the piston rod 56 is a transverse axle 60 to which wheels 59 are affixed.

The axle 60 preferably extends substantially parallel to the longitudinal axis of the carriage or vehicle, so that the wheels 59 are in a plane substantially parallel to the longitudinal axis of the main axle member 21 or the hollow shaft 22. However, as shown in Fig. 1, the axles 60 are arranged at a slight angle to the angle referred to above, and at a slight angle to one another, the wheels 59 being arranged in a plane tangential to the arc of a circle having a center located on the longitudinal center line of the vehicle itself. This arrangement is specifically preferred for use on automobiles or similar vehicles such as the automobile illustrated in Fig. 10 of the drawings, since the parking of such automobiles is greatly facilitated. It will be appreciated from Fig. 10 that the wheels 59 may be located at either end or both ends of the automobile or other vehicle. If desired, one end of the automobile may be placed at the desired position while the other end (the rear end as shown in Fig. 10) may be jacked up on the jack wheels 59 and moved through the arc of a circle which has the center C, in order to move the vehicle through an arc and in a direction approximately laterally to its longitudinal axis.

Means are provided for driving the wheels 59. Referring more particularly to Figs. 1, 2 and 3 of the drawings, the numbers 61 and 62 designate beveled gears which are fixed respectively to the axle 60 and to a telescopic extension 63 of a drive shaft 65. The telescopic extension 63 is splined at 64 to the shaft 65, which rotates in bearing supports 66, 67 fixed to the main cylinder 54. A lower bracket 70 is provided having split rings 71 at its ends which extend into corresponding peripheral channels in the axle 60 and in the telescopic shaft extension 63. The bracket 70 serves to keep the gears 61, 62 in engagement with one another. An upper bracket 72 is provided for maintaining a pair of upper beveled gears 73, 74 in engagement with one another. The gear 74 is fixed to a flexible drive shaft 75, which is connected to a rotatable power means, not shown.

It is a very important and advantageous feature of this invention that means are provided for engaging the jack with the axle when the jack is lowered from its inoperative (upper) position to its operative (lower) position with respect to the supporting surface S. This engaging means includes a jack engaging means 78 which is illustrated in Fig. 8 of the drawings, and an axle engaging means 88 which is illustrated in Fig. 9 of the drawings. The members 78, 88 are arranged to engage and to couple with one another, and are referred to as "coupling means," as will further become apparent hereinafter.

Turning more specifically to Figs. 1–4 and particularly Figs. 6 and 8 of the drawings, the jack engaging means includes a collar 76 shown in Figs. 1–4 fixed to the main axle member 21, or preferably to a non-rotating axle housing supporting the axle. The collar 76 is restrained against rotation with the axle. Collar 76 carries a fixed bracket 140 having vertical, side members 141 having slots 142. As shown in Fig. 12, the inner surface of bracket 140 is covered with a layer of solid, flexible rubber 143 which has slots 144 corresponding to the slots 142. A rectangular housing 77 having sets of curved lugs 145 is located in the bracket 140 with the lugs 145 extending through the corresponding slots 142, 144. (See particularly Fig. 13.) The housing 77 has capacity for limited tilting movement relative to the bracket 140, as indicated by the arrows in Fig. 13, which is important and advantageous as will appear in further detail hereinafter.

Extending through the top and bottom of rectangular housing 77 is a vertical rod 80. A helical spring 81 surrounds the vertical rod 80 and urges the rod 80 downwardly. At its upper end the rod 80 has a head member 82, and at its lower end the vertical rod 80 has a head member 83 which is below the bottom of the housing 77. Fixed to opposite sides of the housing 77, and spaced apart from one another, are a pair of vertically extending angular plates 84, 85 which diverge outwardly away from the housing 77.

The axle engaging member 88 (which appears particularly in Figs. 6 and 9) includes a pair of vertical, spaced apart angular plates which are fixed to the main cylinder 54 and extend at angles substantially equal to the angles of the plates 84, 85 of the jack engaging member 78 of Fig. 8. The spacing of the plates 86, 87 apart from one another is substantially equal to the spacing of the plates 84, 85 from one another. Fixed to the outer surfaces of the plates 86, 87 are lifting lugs 90 which have inclined upper surfaces 91. As appears in Fig. 2, the inclination of the surface 91 is substantially equal to the inclination of the bottom surfaces 92 of the plates 84, 85. It will accordingly be appreciated that, when the jack engaging means 78 and the axle engaging means 88 are brought together and the means 88 lifted with respect to the means 78, the lifting lugs 90 are locked with respect to the surfaces 92.

The number 93 designates a base projection carried at the bottom of the front plate 95 of the axle engaging member 88. The base projection 93 is arranged for contact with the lower end 83 of the vertical rod 80, as indicated in Figs. 2 and 8 for a purpose which will further become apparent hereinafter. The number 94 designates limit stops which are affixed to the upper end of the front plate 95, which serve to prevent plate 95 from continuing further down.

As shown in the drawings, fluid pressure means are provided for causing the automatic operation of the jack device. This means includes a pipe 100 (see particularly Figs. 2 and 3) which extends from the lower portion of auxiliary cylinder 52 into the upper portion of the main cylinder 54. The pipe 100 includes a valve 101 actuated by a lever 102 which is moved by a rod 104 which is pivoted at 103 to the lever 102. The rod 104 has capacity for reciprocation in spaced, aligned guides 105 which are fixed to the cylinder 52. The number 106 designates a spring surrounding the rod 104, normally under compression and bearing against a stop 107 which is fixed to the rod 104. It will be appreciated that spring 106 normally urges the rod 104 toward the left in Fig. 3. However, the free end of rod 104 is aligned with the confronting surface 110 of plate 84 of the jack engaging device 78. When the jack is lowered to the position shown in Fig. 2, the surface 110 contacts the end of rod 104, shifting the rod 104 to the right in opposition to the resistance of the spring 106, snapping the valve 101 from a closed position to an open position, after member 88 has closed with member 78, admitting fluid under pressure into the main lifting cylinder 54.

Means are provided for delaying the extension of the piston rod 50 when the jacking device is swung downwardly toward its operative position. This means, which appears more particularly in Fig. 2, includes a lever-actuated valve 120 connected in the hollow piston rod 50. Valve 120 has a valve operating arm 121 the end of which is located to contact the jack-engaging member 78 when the jacking device swings downwardly. The member 76 and arm 121 are so spaced and arranged that, when the jacking device is swung downwardly by cylinder 27, piston 26 and crank arm 25 can swing through a predetermined arc without causing arm 121 to actuate the valve 120. However, further movement in the same direction opens the valve 120, admitting hydraulic fluid into the cylinder 52. Accordingly, cylinder 52 cannot extend until the jacking device descends to a location slightly above the position shown in dot-dash lines in Fig. 3 of the drawings, at which point the valve 120 is opened, permitting the cylinders 52, 54 to shift radially away from the shaft 22, thereby causing the lifting lugs 90 to clear the bottom surface 92. The valve 120 also has an actuating arm 122 which contacts a stop 123 (Fig. 3), which is attached to the frame, when the jacking device is in its upper (inoperative) position. It is important to observe that the stop 123 is so positioned that the valve 120 does not close until after the latch 131 has engaged latch 130 to secure the jacking device in its upper or inoperative position.

The action of valve 120 is advantageous in that it prevents the jacking device from extending radially to such an extent that the wheels 59 might contact the supporting surface S before the jacking device reaches its vertical position, or that member 88 with stops 94 will be restrained by the top of the member 77.

Latch means are provided for supporting the free end of the jacking device when it is in its raised (inoperative) position, and automatic means are provided for engaging and disengaging the latching means. Turning particularly to Figs. 2 and 3, a latch 130 is attached to the bearing support 66 which engages a corresponding swinging latch 131 which is pivoted to a transverse rigid rod 132 fixed to a portion 134 of the vehicle frame. A spring 135 is provided for urging the latch 131 toward latch 130, and a flexible wire 136 is connected to latch 131 and to the cylinder 27 to draw the latch 131 away from latch 130 when cylinder 27 is actuated in a direction to lower the jacking device. Since the heads of the respective latches are rounded, the latch 130 "cams" the latch 131 aside for automatic latching operation when the jacking device is raised to its inoperative position. Accordingly, it will be understood that the latching device is automatically latched and unlatched to retain or release the free end of the jacking device.

In the operation of the device, it is to be assumed that each jacking device is initially arranged in its elevated or inoperative position as shown in solid lines in Fig. 3. With the jacking device elevated, it is clear of all obstructions and the vehicle may be operated in the usual manner. When it is desired to jack the vehicle, for the purpose of parking or making repairs, for example, the operator actuates the motor or other device which drives the shaft 34, thereby unlatching the latches 130, 131 and also pumping hydraulic fluid through the space 47 in shaft 22 to valve 120. This swings both cylinders 52, 54 as a unit downwardly about the shaft 22. When arm 121 opens valve 120, cylinders 52 and 54 move radially away from the auxiliary shaft 22. It will be observed that, because of the radial movement of cylinder 54, the lifting lugs 90 extend beyond the bottoms of the angular side plates 84, 85 of the jack engaging member 78. When the jack approaches the vertical position as illustrated in Fig. 2, the rod 104 contacts surface 110 and snaps open valve 101 when the members 88 and 78 have met as just described above, admitting hydraulic fluid from the cylinder 52 through pipe 100 into the hydraulic cylinder 54. This extends the piston rod 56, raising both cylinders 52, 54 with respect to the supporting surface S. The respective pairs of angular plates 84, 85 and 86, 87 are then in nested relationship and in contact with one another. With the movement of cylinder 54 upwardly, the plates 86, 87 and the lifting lugs 90 also move upwardly, whereupon the lifting lugs 90, by reason of the inclination of their upper surfaces, become locked with the lower surfaces of the plates 84, 85 thereby securely locking together the axle engaging member 88 and the jack engaging member 78.

Further rotation of the drive shaft 34 pumps additional hydraulic fluid into the large diameter cylinder 54, thereby extending the piston rod 56 and raising the shaft 22 and frame members 20, as well as the body member carried thereon, with respect to the supporting surface S. At this time, the relatively small diameter cylinder 52 also exerts lifting pressure upon the shaft 22, but the main lifting cylinder 54 does the great majority of the lifting through the axle by members 78 and 88. In the course of the lifting operation, the base projection 93 contacts the lower cylindrical end 83 of vertical rod 80, forcing the rod 80 upwardly against the resistance of its spring 81.

When the vehicle is lifted clear of the supporting surface S, the lifting cylinders 54 act upon the main axle (unsprung portion) and the cylinders 52 act upon the shaft 22 (sprung portion). If the load supported by the springs should be changed, as by adding to the load carried by the vehicle, or by unloading the vehicle, the sprung and unsprung portions of the vehicle move vertically relative to one another, requiring either an expansion or a contraction of the cylinders 52. This relative movement is allowed by the expansion cylinder 40 which is in hydraulic communication with cylinders 52 and which has a fluid capacity more than the combined capacities of the cylinders 52. The vehicle may accordingly be loaded or unloaded and subjected to loading shocks while it is on the jacks, without damaging the jacks or the vehicle, and all the while continuing the support of the vehicle even if the springs are fully compressed or broken.

When it is desired to lower the vehicle toward the supporting surface S, the drive shaft 34 is merely rotated in the opposite direction, thereby withdrawing hydraulic fluid from the large diameter cylinder 54, and causing cylinder 54 to retract. When the load of the vehicle is supported on the main axle member 21, further rotation of the drive shaft 34 in the same direction draws the plates 86, 87 downwardly with respect to the plates 84, 85, thereby drawing the lifting lugs 90, 90 down below the lowermost points on the lower surfaces 92 of the plates 84, 85 thereby unlocking the jack engaging means and the axle engaging means. This unlocking operation is assisted by the rod 80, which is urged downwardly by the helical spring 81, urging the base projection 93 and the locking lugs 90 downwardly with respect to the jack engaging member 78.

When the members are unlocked or disengaged, further axial movement of the cylinder 27 causes a corresponding axial movement of the piston 26 which operates through crank levers 25 to swing the jacking device upwardly about the center of the shaft 22, liberating the rod 104 and permitting spring 106 to close the valve 101. The axial movement of piston rod 26 continues until the jack is swung upwardly to the position shown in solid lines in Fig. 3 of the drawings. The jack is then latched in its upper position, as heretofore described.

Although Fig. 3 of the drawings shows the vehicle jacking device displaced about ninety degrees from its vertical (operative) position, it will be appreciated that in many instances it is unnecessary to swing the device upwardly to that extent. It is only necessary to raise the jacking device above the lowest point on the axle housing or to any other desired level to give the desired clearance with respect to the supporting surface.

Fig. 11 shows a modified form of the invention, wherein a relatively small-diameter cylinder 120' is contained in and reciprocable within a relatively large-diameter cylinder 121'. The respective cylinders 120', 121' are hydraulically connected in the manner previously described in connection with cylinders 52, 54 and their operation is essentially similar. Various other modifications may be made as to the construction and arrangement of the cylinders without departing from the spirit and scope of this invention.

Fig. 14 shows how the axle-engaging member 88 may be found in a tilted or inclined position with respect to the axle member 21 when the vehicle is non-uniformly loaded or the springs on one side of the vehicle are not maintaining the same axle to frame divergence as on the other. The arrangement shown in Fig. 13 permits the jack-engaging member 78 to tilt to a corresponding angle when the members 78, 88 are brought together. In this manner, a proper locking function is assured, notwithstanding the initial angular relation between the member 78, 88.

It will accordingly be appreciated that the jacking device of this invention may be attached to the frame of any vehicle such as a truck, automobile, trailer or the like, and has capacity for swinging movement from a sprung portion of the vehicle to engage an unsprung portion such as an axle or axle housing which supports the frame through springs or other compressible members. The device thereafter raises the axle and with it the body of the vehicle, including any load supported by the body. The device also compensates for any change in the vertical distance between the axle and the frame due to compression or decompression of the springs or other compressible members which extend between the main axle and the body. In fact, if the vehicle is a truck or trailer it may be loaded or unloaded while supported on jacking devices of this invention, and the springs or other compressible devices are permitted to compress or decompress as the loading or unloading operation proceeds.

It will also be appreciated that, when the vehicle is lifted by the jacking device, it may be moved along the supporting surface S by rotating the flexible drive shaft 75 causing the wheels 59 to rotate about their axes. However, it is to be appreciated that this is not an essential feature of the invention inasmuch as any other form of base, such as a stationary base, may be substituted for the wheels 59 if desired. For example, when it is merely desired to utilize the jack as a stand, a flat-bottom base is entirely adequate.

Although hydraulic cylinders have been shown in the drawings for jacking the vehicle and for swinging the jacking device between its operative and inoperative positions with respect to the vehicle frame, it will be appreciated that other equivalent means may be substituted. For example, purely mechanical gear-driven devices may be substituted for the jack swinging mechanism, and other forms of the jacking devices themselves may be substituted.

It will further be appreciated that the rotation of the wheels 59, 59 may be caused by the vehicle's motor or may be caused directly or indirectly by an electric, fluid or gaseous motor, or through a flexible or fixed shaft with gears. The rotation of the wheels 59, 59 is, of course, preferably reversible.

While the device illustrated in the drawings has two wheels, it will of course be appreciated that various numbers of wheels may be utilized, depending upon the intended service of the jacking device. Similarly, the arrangement of the wheel or wheels with respect to the jack may be varied in accordance with specific requirements.

If desired, jacking devices having wheels 59 may be provided on either or both axles of a vehicle, or any number of axles of a multiple axle vehicle. The vehicle can be lifted and then rotated or shifted in any desired manner. In fact, one end of the vehicle can be rotated in one direction and the other end of the vehicle in the opposite direction, either at the same time or at different times.

Although the drawings show means for causing the jacking device to engage and to lift the main axle housing of the vehicle, it will be understood that other unsprung portions of the body may be engaged, all of which are included within the meaning of the term "axle member" as used herein.

While I have described my invention by reference to specific embodiments thereof, it will be apparent to those skilled in the art that various changes other than those referred to above may be made in the form of the device, that equivalent elements may be substituted for those illustrated in the drawings, and that certain features of the invention may be used to advantage independently of the use of other features, all within the spirit and scope of the invention as defined in the annexed claims.

Having thus described my invention, I claim:

1. In combination with a movable body member and a support therefor, and resilient means connecting said body member with capacity for limited vertical movement relative to said support, said support having wheels providing for its movement along a supporting surface, the combination which comprises a jacking device which is carried by said body member with capacity to lift said body member relative to said supporting surface, said jacking device comprising an upper portion and a lower portion which are movable relative to one another and power means connected to move said upper portion upwardly relative to said lower portion, pivot means carried by the body and connected to said upper portion for attaching the upper portion pivotally to the body member, operating means connected to said jacking device for swinging said jacking device about its pivot, coupling means carried by said supporting structure, matching coupling means carried by said upper portion of said jacking device in a position to engage said coupling means carried by said supporting structure, the respective coupling means having interengaging surfaces which secure the jacking device with respect to the supporting structure when the supporting structure is raised or lowered and an auxiliary moving means operatively connected to said matching coupling means for moving said matching coupling means toward and away from said pivot means to provide clearance between said coupling means and said matching coupling means.

2. The jacking device defined in claim 1, wherein said power means is connected to move said upper portion downwardly relative to said lower portion.

3. The jacking device defined in claim 1, wherein automatic latching means is provided for securing said jacking device with respect to said body member, and automatic means are connected to said operating means to release said latching means.

4. In combination with a vehicle having a main axle member, carrying wheels for movement along a supporting surface, said main axle member being connected to a resilient means which in turn supports a carriage above said main axle member, the structure comprising a jacking device which is carried by the carriage for lifting said carriage axle member and wheels above said supporting surface, said jacking device comprising a jack support carried by said carriage for swinging movement about it, a jack body, a jack base, said base being extensible and retractable toward and away from said jack body, power means for causing such extension and retraction, connecting means including a coupling member attached to said axle member and another coupling member attached to said jack body, means for swinging said jack body about the axis of said jack support and an auxiliary moving means operatively connected to said jack body to reciprocate said jack body toward and away from said carriage for moving one of said coupling members beyond the other of said coupling members to provide clearance between the two so that the lifting movement of the jack may operate to bring about engagement and coupling of the respective coupling members, said coupling members including projective means for securing them in a substantially fixed position with respect to one another.

5. The combination defined in claim 4, wherein said coupling member on said jack body includes a supporting member extending under the coupling member attached to said main axle member when the respective coupling means are engaged, whereby a lifting force when applied to said body is transmitted through said coupling members to said axle member.

6. The combination defined in claim 4, wherein an auxiliary wheel is mounted on said jack base for supporting said jack body, said wheel extending generally transversely of said vehicle.

7. The combination defined in claim 4, wherein the coupling means on the axle member includes an angular plate comprising a stop member embracing the mating coupling means preventing relative axial movement of said mating coupling means.

8. In a jacking device for lifting from a supporting surface a vehicle having an axle member and wheels carried by said axle member, a pivot member carried by said vehicle above said supporting surface, a main fluid pressure cylinder connected to said pivot member for swinging movement about said pivot member and including a base arranged to stand on the supporting surface, power means for swinging said main cylinder around about said pivot member, coupling means carried by the main fluid pressure cylinder and an auxiliary cylinder means for moving said main fluid pressure cylinder toward and away from the pivot member as said jack is being swung about said pivot member, for moving said coupling means beyond said axle member to provide clearance between the two, said coupling means including engaging means for engaging said axle member after said power means has swung the main fluid pressure cylinder downwardly and said auxiliary cylinder means has extended said main cylinder.

9. The jacking device defined in claim 8 wherein the main fluid cylinder is more powerful than the auxiliary fluid cylinder and exerts more lifting force on said axle member than the auxiliary fluid pressure means can exert on the pivot member.

10. In a jacking device for a vehicle having relatively movable portions which are supported by a supporting surface, a jack pivotally attached to one of said portions, a jack-engaging and coupling device attached to the other of said portions, means for swinging said jack toward and away from said jack-engaging and coupling device, coupling means carried by said jack shaped for engagement with said jack-engaging and coupling device, auxiliary means for moving said jack radially of the pivot point to provide clearance between said coupling means and said jack-engaging and coupling device, and means for locking said coupling devices to one another in response to the lifting movement of said jack.

11. The jacking device defined in claim 10, wherein the locking means includes lifting lugs carried by said jack having upper surfaces which are inclined upwardly away from said jack.

12. The jacking device defined in claim 10, wherein the jack-engaging and coupling device includes members having lug-engaging surfaces which are inclined in accordance with the inclination of the upper surfaces of said lugs.

13. The jacking device defined in claim 10, wherein means are provided for tilting said jack-engaging device to compensate for slight angular mis-alignment with said engaging means which is carried by said jack.

14. In a jacking device for a vehicle having relatively movable portions which are supported by a supporting surface, a fluid actuated jack swingably attached to one of said portions, means for swinging said jack, said jack including a pair of cylinders operatively associated with one another, one of said cylinders, being a lifting cylinder having an extensible piston with a load-supporting base thereon, jack-engaging and coupling means fixed to the other of said relatively movable portions of said vehicle, and mating coupling means carried by and fixed to said lifting cylinder and arranged for coupling connection to said jack-engaging means, said other cylinder being an auxiliary cylinder means for moving said lifting cylinder toward and from the first said portion as said jack is being swung about the first said portion, for moving said mating coupling means beyond said jack engaging and coupling means to provide clearance between the two.

15. In a jacking device for a vehicle having relatively movable portions which are supported by a supporting surface, a fluid actuated jack swingably attached to one of said portions, said jack including a pair of cylinders operatively associated with one another, one of said cylinders being an auxiliary cylinder which is connected and arranged to retract and extend the other cylinder toward and from said portion, said other cylinder having an extensible piston with a load-supporting base thereon, jack-engaging and coupling means fixed to the other of said relatively movable portions of said vehicle, and mating coupling means carried by and fixed to one of said cylinders and arranged for coupling connection to said jack-engaging means, wherein said jack-engaging and coupling means includes a locking device having an inclined surface, said mating coupling means having a mating locking device having a correspondingly inclined surface, and means for swinging said mating locking device under the first mentioned locking device when the first mentioned cylinder is extended so that the mating coupling means is locked to the jack-engaging means when said cylinder lifts the vehicle.

16. The jacking device defined in claim 15, wherein resilient means are associated with said jack-engaging and coupling means and arranged to contact with mating coupling means urging said connecting means downwardly relative to said jack-engaging means, serving to unlock the respective locking device after the vehicle is lowered.

17. The jacking device defined in claim 16, wherein the mating coupling means includes a base projection extending under said jacking means and wherein said jack engaging and coupling means includes a resiliently urged rod arranged to bear downwardly upon said base projection.

18. In a jacking device for lifting from a supporting surface a vehicle having an axle member and wheels carried by said axle member, a pivot member carried by said vehicle above said supporting surface, a main fluid pressure cylinder connected to said pivot member for swinging movement about said pivot member and including a base arranged to stand on the supporting surface, power means for swinging said main cylinder around about said pivot member, an auxiliary fluid pressure cylinder affixed to said main fluid pressure cylinder and connected to extend and retract said main fluid pressure cylinder bodily toward and away from said pivot member, and means carried by the main fluid pressure cylinder for securely engaging said axle member after said power means swings the cylinder downwardly and said auxiliary fluid pressure means extends the main cylinder, whereby said main cylinder means engages and lifts said axle member, wherein valve means are provided for blocking the flow of fluid to said auxiliary fluid cylinder, thereby preventing extension of said main fluid pressure cylinder from said pivot member, and wherein automatic means are connected to said valve means and positioned for actuation in response to movement of said fluid pressure cylinder means for opening said valve means after said main fluid pressure cylinder means is swung downwardly about said pivot member.

19. In a jacking device for a vehicle having relatively movable portions which are supported by a supporting surface, a fluid actuated jack swingably attached to one of said portions, said jack including a pair of cylinders operatively associated with one another, one of said cylinders being an auxiliary cylinder which is connected and arranged to retract and extend the other cylinder toward and from said portion, said other cylinder having an extensible piston with a load-supporting base thereon, jack-engaging and coupling means fixed to the other of said relatively movable portions of said vehicle, and an expansion cylinder having a spring-urged piston which is hydraulically connected to said auxiliary cylinder means to receive any fluid expelled from said cylinder means when said relatively movable portions are moved toward one another, and to supply fluid to said auxiliary cylinder means when the relatively movable portions are separated.

References Cited in the file of this patent

UNITED STATES PATENTS

| | | |
|---|---|---|
| 1,354,338 | Rapson | Sept. 28, 1920 |
| 2,045,524 | Fehrmann | June 23, 1936 |
| 2,050,690 | Connell | Aug. 11, 1936 |
| 2,078,596 | Barr et al. | Apr. 27, 1937 |
| 2,222,116 | Mott | Nov. 19, 1940 |
| 2,241,877 | Contrino et al. | May 13, 1941 |
| 2,369,545 | Dunn | Feb. 13, 1945 |
| 2,442,881 | Soskin | June 8, 1948 |
| 2,443,209 | Thornburg | June 15, 1948 |
| 2,619,319 | Lucas | Nov. 25, 1952 |
| 2,685,934 | Coloma | Aug. 10, 1954 |
| 2,691,505 | Hursh | Oct. 12, 1954 |

FOREIGN PATENTS

| | | |
|---|---|---|
| 179,988 | Great Britain | Nov. 15, 1921 |
| 424,367 | Great Britain | Feb. 20, 1935 |